United States Patent
Lebduska et al.

[11] 3,904,269
[45] Sept. 9, 1975

[54] FIBER OPTIC CABLE CONNECTOR

[75] Inventors: Robert L. Lebduska, La Mesa; Gary M. Holma, San Diego, both of Calif.

[73] Assignee: The United States of America as represented by the Secretary of the Navy, Washington, D.C.

[22] Filed: Jan. 28, 1974

[21] Appl. No.: 437,428

[52] U.S. Cl. ............................... 350/96 C; 350/96 B
[51] Int. Cl.² ............................................ G02B 5/16
[58] Field of Search .......... 350/96 B, 96 C; 250/227

[56] References Cited
UNITED STATES PATENTS

| | | | |
|---|---|---|---|
| 3,455,625 | 7/1969 | Brumley et al. | 350/96 C |
| 3,638,013 | 1/1972 | Keller | 350/96 B X |
| 3,749,932 | 7/1973 | Jones | 350/96 B X |
| 3,806,225 | 4/1974 | Codrino | 350/96 C |

OTHER PUBLICATIONS
Parfitt et al., Article in *Electronic Components*, Jan. 28, 1972, pp. 69 and 73–75 cited.

*Primary Examiner*—David H. Rubin
*Attorney, Agent, or Firm*—R. S. Sciascia; G. J. Rubens

[57] ABSTRACT

A connector for coupling fiber optic cables having a terminal with a bore surface into which the bared ends of the fibers are compressed and secured. The terminal is housed in an outer coupling ferrule which is adapted to be detachably connected to a mating ferrule of a splice connector or to a terminal board or the like. Resilient means are longitudinally positioned between the respective terminal and its ferrule to bias the terminal in a face-to-face relationship to an adjoining cable end. An aligning means is provided to axially position the two cable ends to ensure maximum light transmission.

2 Claims, 4 Drawing Figures

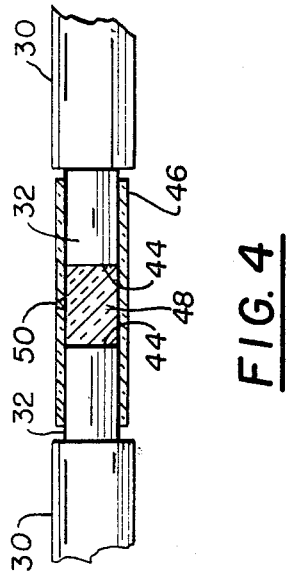
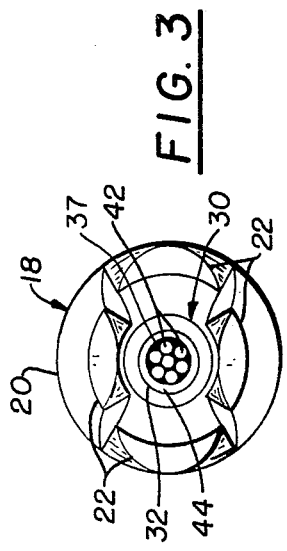
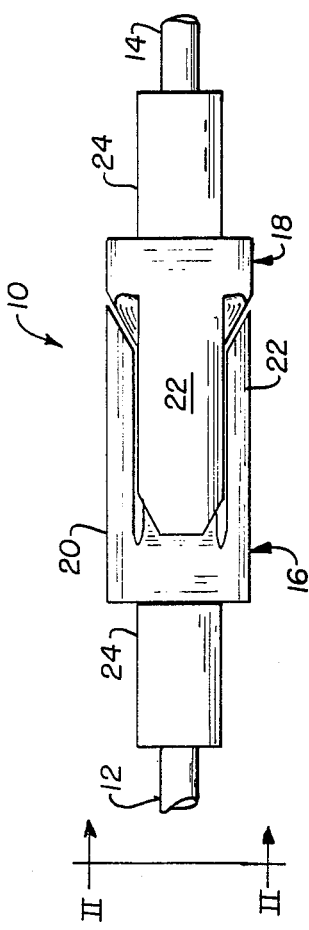
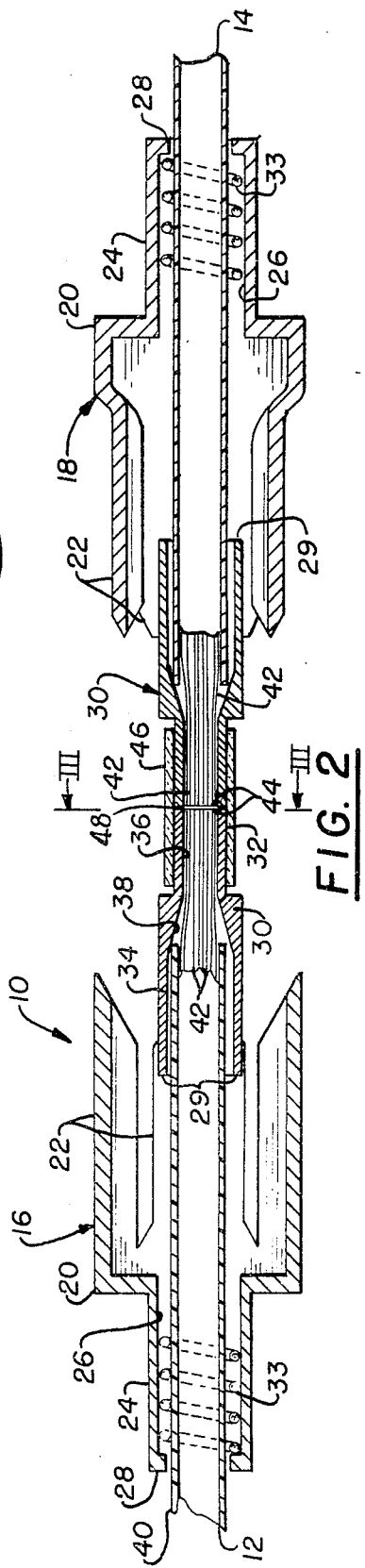

FIBER OPTIC CABLE CONNECTOR

BACKGROUND OF THE INVENTION

This invention relates to cable connectors designed primarily for coupling optical fiber cables, but it is understood that it can be used for any purposes for which it is found applicable.

The transmission of radiant energy along transparent optical fibers is becoming of increasing importance in military applications for communication and other uses. As in electrical wiring applications, there is a need to provide connectors to mate optical cables to each other for splicing purposes as well as interfacing such optic requirements cables into terminal boards and the like. However, the requirrements in joining fragile optic cables having individual glass fibers with a diameter in the order of 25 microns are obviously more critical. It is necessary that the optical coupling maximize the transmission of light across the junction; be capable of satisfactory performance under tensile loads, thermal shock, salt spray, mechanical shock, vibration and humidity profiles; and further be capable of optimum performance under repeated coupling/decoupling connections as well as having interchangeable components.

Although the electrical connector art may, at first blush, appear to be similar, because of the above limitations electrical type connectors are not able to provide satisfactory performance for optical applications.

SUMMARY OF THE INVENTION

Some of the principal problems in coupling fiber optic cables are the relatively high optical light transmission losses across the junction, and, further, of maintaining the bared ends of said adjoining cables with a predetermined optimum relationship.

These problems are met in the present invention by applying a bias to said optical connection urging the mating cable ends toward each other. Such a bias is accomplished by utilizing a resilient means, such as a coil spring, longitudinally positioned between the terminal and an outer connecting ferrule to apply a compressive force on the junction. In a splice-type coupling, the mating ferrules are detachably connected together so that the terminals are urged together with a predetermined and controlled pressure that will not damage the finely polished surfaces that are in face-to-face relation. Such a bias also ensures that the cable ends will remain in close contact with each other, and with an intervening index matching material. The biasing means has an additional function in that should a tensile force be applied to a coupled cable tending to separate the connection, the resilient means will absorb some of the force that may otherwise tear apart a rigid, non-resilient connection. An alignment sleeve fits over the inner adjoining edges of the mating terminals to maintain the cable ends in axially aligned relationshi .

The terminal is provided with a bore extending fro n one end to another to receive the corresponding bared fiber ends of the cable. The bore is stepped down in diameter, the larger diameter to accommodate the protective cladding around the cable, and the smaller diameter snugly receiving the bared fiber ends. The shoulder between the two bore surfaces is funnel-shaped to cause the loosely packed bared fiber end to be compressed into a compact association when inserted into the smaller diameter bore.

Prior to insertion of the bared cable end within its terminal, the bore surfaces and fiber ends are filled with an epoxy material which are allowed to harden to seal and anchor the cable end rigidly within the terminal. The free ends of the bared fibers protruding from the small end bore of the terminal form a rigid epoxy matrix that permits the fiber faces to be ground smooth without shattering the fiber ends that would otherwise cause discontinuities and loss of light transmission across the junction.

STATEMENT OF THE OBJECTS OF THE INVENTION

It is a primary object of this invention to provide a connector for coupling fiber optic cables that has more efficient light transmitting characteristics.

Another important object is to provide such a connector that has a positive compressive force to maintain the optical junction together in a predetermined relationship.

Other important objects are to provide such a connector that maintains the optical junction in an axially aligned position; that has quick disconnect features; that has interchangeable components; and that has a stress relieving feature when a tensile force is applied on the connected cables.

BRIEF DESCRIPTION OF THE DRAWINGS

FIG. 1 is a side elevation of the novel assembled connector coupling together two fiber optic cables.

FIG. 2 is an enlarged longitudinal view, partially in section, taken along line II—II of FIG. 1 with the outer attaching ferrules pulled apart to show the details of the optical junction.

FIG. 3 is a transverse section taken along a line III—III of FIG. 2 passing through the optical junction.

FIG. 4 is a modified optical junction employing an index matching material confined between the end faces of the optical cables by an alignment sleeve.

DESCRIPTION OF THE PREFERRED EMBODIMENT

Referring to the drawings where like reference numerals refer to similar parts throughout the drawings there is shown in FIg. 1 the novel connector 10 employed to splice together two fiber optic cables 12 and 14. It is obvious that the splice type connector 10 is representative of only one type of installation in which the novel connector can be employed, and that the connector can be employed to couple a fiber optic cable to a terminal board or the like.

In the preferred embodiment in FIG. 1 splice connector 10 comprises two identical mating halves 16 and 18, and, therefore, the description of one connector-half applies equally to the other connector-half. Each connector-half includes an outer ferrule 20 having a plurality of longitudinally extending, alternately recessed spring fingers 22 adapted to mate and interconnect resiliently with the fingers of the other half to form a quick disconnect. Each ferrule 20 has a reduced diameter shank portion 24 having a core opening 26 inwardly terminating in an internal shoulder 28 for a purpose later to be described.

Each fiber optic cable is provided with a tubular terminal 30 having a reduced outer shank portion 32 in which the bared end of the respective cable is anchored. Terminal 30 telescopically mates in bore 26 of ferrule shank 24. A resilient material, such as a compression coil spring 33, is longitudinally positioned between ferrule shoulder 28 and the inner end 29 of terminal 30 for biasing apart the respective parts for a purpose later to be described.

It should be noted in FIG. 2, that springs 33 are in an expanded relaxed position because the ferrules are pulled back off their respective terminals.

A bore 34 extends through the ferrule and terminates in a reduced bore 36 in terminal shank 32. A bevelled conical shoulder 38 joins the two bore surfaces and forms a funnel-shaped mouth leading into bore 36 for a purpose later to be described.

Prior to inserting each cable to its respective terminal, a portion of the outer protective PVC jacket 40 is stripped off for a length slightly longer than the length of bore 36. An epoxy compound 37 or other suitable potting material is inserted in bores 34 and 36 as well as forced in between the interstices of the free ends of the uncovered individual glass fibers 42 (FIG. 3).

For purposes of illustration, the number of fibers 42 shown in the figures are greatly reduced in number, and the diameter increased (FIG. 3). In practice, a typical fiber glass cable Type 5011 manufactured by Corning Glass Works contains about 900, 1.8 Mil diameter glass core/glass clad fibers with numerical aperture of about .63.

After the bore surfaces 34 and 36 are filled with the epoxy, the epoxy-wetted ends of the cable fibers are inserted into their respective terminals, with the bared ends protruding slightly from the outer end 44 of shank 32. The epoxy fills all of the spaces between the two bore surfaces of the terminal and the jacket 40, and between the bare ends of the cable. When the epoxy sets it anchors the cable end to the terminal to prevent longitudinal displacement of the cable ends that may otherwise vary the spacing between the facing bared ends of the fibers and adversely affect the light transmission across the junction. The epoxy material also serves to seal the bared cable end from the elements to avoid the intrusion of any contaminants through the terminal to the faces of the bared cable ends that would also interfere with the light transmission across the optical junction.

After the epoxy has hardened, the protruding fiber ends from shank end 44 comprise a rigid matrix that can be finely ground smooth without shattering the ends that may otherwise create discontinuities in the face of the ends of the cable to cause a loss in light transmission at the optical junction.

Another important feature of the invention is the provision for axially aligning the opposing faces 44 of the bared fiber optical cables being connected to ensure maximum light transmission, and in the instant invention this is accomplished by use of a sleeve 46 which telescopically slides over the respective shanks 32 of the opposing terminals 30.

Where it is desirable to provide an index matching material 48 between fiber end faces 44, which material may be in liquid or solid form, sleeve 46 can be made longer in length to accommodate the material. This embodiment is disclosed in FIG. 4. Sleeve 46 is preferably made of a plastic or glass material having an index of refraction lower than that of the indexing material, or can be made of metal with a reflective bore surface. To accommodate a liquid index matching material the length of sleeve 46 can be accurately dimensioned so that when the sleeve ends abut the shoulders of the respective terminals a precisely configured index matching cavity can be defined. If desired, where a liquid matching material is employed a suitable filling hole and plug 50 may be provided in the sleeve leading to the cavity.

After the ends of the cables 12 and 14 are suitably assembled and aligned, the outer ferrules 20 are oriented so that the fingers can be slidably mated to spring secure the ferrules together. In the assembled condition, as represented in FIG. 1, springs 33 serve to maintain the fiber cable faces at the optical junction in close contact with each other, or the intervening index matching material. In addition, springs 33 provide a corollary advantage in that any tension applied to the respective cable can be absorbed by spring 33 providing a certain "give" without which the fragile cable or the connection may be accidentally parted. If desired, a thin spacer washer 48 or built-in ridge may be disposed between the ends of shank 32 to avoid direct contact between the fiber ends during assembly that may otherwise damage the optical faces by the compressive force, and which washer may also function as a reservoir for the index-matching material.

The novel connector offers numerous advantages. In addition to being simple and inexpensive in construction, the hermaphroditic configuration of the connector parts greatly reduces the provisioning and storage requirements of spare parts, a matter of considerable moment to the U.S. Navy for advanced naval bases and on board ships. The resilient biasing of the optical junction assures not only a positive force to maintain the opposing fiber faces together with an accurate spacing therebetween, but enhances the physical integrity of the junction from shock, vibration and tensile loads that may be inadvertently applied to the cables. Improved efficiency of the optical junction is also obtained by use of an alignment sleeve to maintain terminal alignment of the optical junction with or without the presence of an index matching material.

Obviously many modifications and variations of the present invention are possible in the light of the above teachings. It is therefore to be understood that within the scope of the appended claims the invention may be practiced otherwise than as specifically described.

What is claimed is:

1. A quick-disconnect connector having identical halves for coupling two optical cables in axial alignment, each cable including a plurality of individual fibers having bared ends comprising:

an identical terminal for each cable having a bored opening extending therethrough for receiving at an inner end the bared fiber ends of each respective cable, which fiber ends terminate at an outer end of the terminal, said terminal having a tapered bore portion for compacting the terminated fiber ends;

potting means for securing the cable fibers within their respective tapered bored portions;

an intermediate sleeve for receiving and for aligning the outer ends of the terminals with the bared ends of the respective cables in face-to-face relation;

an identical outer ferrule for housing each terminal and having an internal shoulder;

each terminal being slidably mounted longitudinally within its respective ferrule after the connector halves are coupled together;

identical coiled compression springs disposed longitudinally between each of the shoulders of said outer ferrules and the ends of their respective terminals;

each of said outer ferrules having a plurality of identical, circumferentially spaced resilient fingers extending longitudinally the cables, the fingers of one ferrule longitudinally slidable between the fingers of the other ferrule in mating relationship frictionally to secure the connector halves together and to maintain each of said coil springs in a compressed condition for applying an axial force on the respective terminals, maintaining the bared cable ends in face-to-face relationship within the intermediate sleeve and enhancing optical light transmission across the junction;

each of said coil springs serving also to absorb any tensile force that may be applied to its respective cable tending to separate the connector halves.

2. The connector of claim 1 wherein means are positioned between the ends of the terminals only for spacing the cable ends apart to avoid damage to their faces by the compressive force of the coil springs.

* * * * *